(12) United States Patent
Tanikawa

(10) Patent No.: US 9,177,528 B2
(45) Date of Patent: Nov. 3, 2015

(54) SCREEN INSPECTION DEVICE, SCREEN INSPECTION METHOD, AND PROGRAM

(75) Inventor: Yukiko Tanikawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/234,932

(22) PCT Filed: Jun. 11, 2012

(86) PCT No.: PCT/JP2012/003786
§ 371 (c)(1),
(2), (4) Date: Jan. 24, 2014

(87) PCT Pub. No.: WO2013/014849
PCT Pub. Date: Jan. 31, 2013

(65) Prior Publication Data
US 2014/0139545 A1 May 22, 2014

(30) Foreign Application Priority Data
Jul. 26, 2011 (JP) .................................. 2011-163564

(51) Int. Cl.
*G09G 5/10* (2006.01)
*G09G 5/02* (2006.01)
*G06T 7/00* (2006.01)

(52) U.S. Cl.
CPC ................ *G09G 5/02* (2013.01); *G06T 7/0002* (2013.01); *G09G 5/10* (2013.01); *G06T 2207/30168* (2013.01)

(58) Field of Classification Search
None
See application file for complete search history.

(56) References Cited

U.S. PATENT DOCUMENTS 6,081,253 A * 6/2000 Luke et al. .................... 345/604
8,860,748 B2 * 10/2014 Campbell et al. ............. 345/593
(Continued)

FOREIGN PATENT DOCUMENTS

JP   08-249441 A   9/1996
JP   10-188023 A   7/1998
(Continued)

OTHER PUBLICATIONS

Shen, Yu-Chuan, Yung-Sheng Chen, and Wen-Hsing Hsu. "Quantitative evaluation of color harmony via linguistic-based image scale for interior design." Color Research & Application 21.5 (1996): 353-374.*

(Continued)

*Primary Examiner* — Tize Ma
*Assistant Examiner* — Yu Chen
(74) *Attorney, Agent, or Firm* — Sughrue Mion, PLLC

(57) ABSTRACT

A combination selecting unit (20) creates a plurality of element combinations of which each is a combination of two display elements, and selects element combinations in which a distance between two display elements is a threshold value or less. A combination classifying unit (30) selects element combinations, in which any one of color difference, saturation difference, brightness difference, and both brightness and saturation of a color combination of two display elements exceed respective predetermined threshold values, from the element combinations. Then, the combination classifying unit (30) calculates an appearance ratio for each color combination. The appearance ratio is a ratio of the number of the element combinations belonging to the color combination to the total number of the element combinations created by the combination selecting unit (20). A screen determination unit (40) determines that the screen data in which the sum of the appearance ratios exceeds a threshold value has an undesirable color combination which makes the user feel fatigue or discomfort.

6 Claims, 19 Drawing Sheets

(56) References Cited

U.S. PATENT DOCUMENTS

| | | | |
|---|---|---|---|
| 2007/0076013 A1* | 4/2007 | Campbell et al. | 345/589 |
| 2010/0194775 A1* | 8/2010 | Ou et al. | 345/594 |
| 2014/0089781 A1* | 3/2014 | Hoguet | 715/234 |

FOREIGN PATENT DOCUMENTS

| | | |
|---|---|---|
| JP | 2903604 B2 | 6/1999 |
| JP | 2002-197403 A | 7/2002 |
| JP | 2005-165437 A | 6/2005 |
| JP | 2008-146227 A | 6/2008 |
| JP | 2010-128533 A | 6/2010 |

OTHER PUBLICATIONS

Nayatani, Yoshinobu, et al. "Color-appearance model and chromatic-adaptation transform." Color Research & Application 15.4 (1990): 210-221.*

Masataka Tokumaru et al., "Quantitative Evaluation of Color Harmony Using Fuzzy Reasoning," Journal of Japan Society for Fuzzy Theory and Intelligent Informatics, Feb. 15, 2007, pp. 57-68, vol. 19, No. 1.

International Search Report of PCT/JP2012/003786 dated Aug. 21, 2012.

Communication dated Nov. 21, 2014 from the European Patent Office in counterpart European Patent Application No. 12817942.1.

* cited by examiner

FIG. 14

ATTRIBUTE INFORMATION OF CONSTITUTIONAL ELEMENT
(OUTPUT EXAMPLE FROM COMBINATION SELECTING UNIT 20)

| ELEMENT ID | ELEMENT KIND | CHARACTER COLOR | | BACKGROUND COLOR | | POSITION (UPPER LEFT) | | POSITION (LOWER RIGHT) | | SIZE | | AREA |
|---|---|---|---|---|---|---|---|---|---|---|---|---|
| | | (R, G, B) | (H, S, V) | (R, G, B) | (H, S, V) | top(px) | left(px) | down(px) | right(px) | height(px) | width(px) | |
| CP01 | Body | (0, 0, 0) | (0, 0, 0) | (255, 255, 255) | (0, 0, 100) | 0 | 0 | 770 | 870 | 770 | 870 | 669900 |
| CP02 | LEVEL 1 HEAD | (255, 255, 255) | (0, 0, 100) | (0, 102, 51) | (150, 100, 51) | 30 | 30 | 80 | 850 | 50 | 820 | 41000 |
| CP03 | GROUP1 | (0, 0, 0) | (0, 0, 0) | (222, 226, 224) | (150, 1, 88) | 30 | 30 | 300 | 850 | 270 | 820 | 221400 |
| CP04 | ITEM HEAD a | (0, 0, 0) | (0, 0, 0) | (102, 255, 51) | (105, 80, 100) | 110 | 50 | 150 | 370 | 40 | 320 | 12800 |
| CP05 | INPUT BOX a | (0, 0, 0) | (0, 0, 0) | (255, 255, 255) | (0, 0, 100) | 110 | 390 | 150 | 830 | 40 | 440 | 17600 |
| CP06 | ITEM HEAD a | (0, 0, 0) | (0, 0, 0) | (102, 255, 51) | (105, 80, 100) | 165 | 50 | 205 | 370 | 40 | 320 | 12800 |
| CP07 | INPUT BOX a | (0, 0, 0) | (0, 0, 0) | (255, 255, 255) | (0, 0, 100) | 165 | 390 | 205 | 830 | 40 | 440 | 17600 |
| CP08 | ITEM HEAD a | (0, 0, 0) | (0, 0, 0) | (102, 255, 51) | (105, 80, 100) | 220 | 50 | 280 | 370 | 60 | 320 | 19200 |
| CP09 | INPUT BOX a | (0, 0, 0) | (0, 0, 0) | (255, 255, 255) | (0, 0, 100) | 220 | 390 | 280 | 830 | 60 | 440 | 26400 |
| CP10 | LEVEL 1 HEAD | (255, 255, 255) | (0, 0, 100) | (0, 102, 51) | (150, 100, 40) | 330 | 30 | 380 | 850 | 50 | 820 | 41000 |
| CP11 | GROUP1 | (0, 0, 0) | (0, 0, 0) | (222, 226, 224) | (150, 1, 88) | 330 | 30 | 720 | 850 | 390 | 820 | 319800 |
| CP12 | ITEM HEAD b | (0, 0, 0) | (0, 0, 0) | (102, 255, 51) | (105, 80, 100) | 400 | 50 | 440 | 370 | 40 | 320 | 12800 |
| CP13 | INPUT BOX b | (0, 0, 0) | (0, 0, 0) | (255, 255, 255) | (0, 0, 100) | 400 | 390 | 440 | 625 | 40 | 235 | 9400 |
| CP14 | ITEM HEAD b | (0, 0, 0) | (0, 0, 0) | (102, 255, 51) | (105, 80, 100) | 455 | 50 | 495 | 370 | 40 | 320 | 12800 |
| CP15 | INPUT BOX b | (0, 0, 0) | (0, 0, 0) | (255, 255, 255) | (0, 0, 100) | 455 | 390 | 495 | 625 | 40 | 235 | 9400 |
| CP16 | ITEM HEAD b | (0, 0, 0) | (0, 0, 0) | (102, 255, 51) | (105, 80, 100) | 510 | 50 | 550 | 370 | 40 | 320 | 12800 |
| CP17 | INPUT BOX b | (0, 0, 0) | (0, 0, 0) | (255, 255, 255) | (0, 0, 100) | 510 | 390 | 550 | 625 | 40 | 235 | 9400 |
| CP18 | ITEM HEAD b | (0, 0, 0) | (0, 0, 0) | (102, 255, 51) | (105, 80, 100) | 565 | 50 | 605 | 370 | 40 | 320 | 12800 |
| CP19 | INPUT BOX b | (0, 0, 0) | (0, 0, 0) | (255, 255, 255) | (0, 0, 100) | 565 | 390 | 605 | 625 | 40 | 235 | 9400 |
| CP20 | ITEM HEAD b | (0, 0, 0) | (0, 0, 0) | (102, 255, 51) | (105, 80, 100) | 620 | 50 | 680 | 370 | 60 | 320 | 19200 |
| CP21 | INPUT BOX b | (0, 0, 0) | (0, 0, 0) | (255, 255, 255) | (0, 0, 100) | 620 | 390 | 680 | 830 | 60 | 440 | 26400 |
| CP22 | ITEM HEAD c | (0, 0, 0) | (0, 0, 0) | (102, 255, 51) | (105, 80, 100) | 695 | 50 | 735 | 370 | 40 | 320 | 12800 |
| CP23 | INPUT BOX c | (0, 0, 0) | (0, 0, 0) | (255, 255, 255) | (0, 0, 100) | 695 | 390 | 735 | 830 | 40 | 440 | 17600 |

FIG. 15

OVERLAP INFORMATION AND CLOSE INFORMATION
OF CONSTITUTIONAL ELEMENT
(OUTPUT EXAMPLE FROM OVERLAP DETERMINATION UNIT 202)

| ELEMENT ID | OVER-LAPPING ELEMENT | IMMEDIATELY UPPER ELEMENT | | | | ELEMENT BEING CLOSE |
|---|---|---|---|---|---|---|
| | | ELEMENTS OF WHICH ENTIRETY OVERLAPS IMMEDIATELY LOWER ELEMENT WITHOUT HIDING IT AND WITHOUT CONTACTING SIDE THEREOF | ELEMENTS OF WHICH ENTIRETY OVERLAPS IMMEDIATELY LOWER ELEMENT WITHOUT HIDING IT AND WITH CONTACTING SIDE THEREOF | ELEMENTS OF WHICH PART OVERLAPS IMMEDIATELY LOWER ELEMENT | ELEMENTS WHICH HIDES ENTIRE OF IMMEDIATELY LOWER ELEMENT | |
| CP01 | 1 | CP03, CP11 | CP03, CP11 | – | – | – | – |
| CP02 | 0 | – | – | – | – | CP04, CP05 |
| CP03 | 1 | CP02, CP04, CP05, CP06, CP07, CP08, CP09 | CP04, CP05, CP06, CP07, CP08, CP09 | CP02 | – | CP11 |
| CP04 | 0 | – | – | – | – | CP02, CP05, CP06 |
| CP05 | 0 | – | – | – | – | CP02, CP04, CP07 |
| CP06 | 0 | – | – | – | – | CP04, CP07, CP08 |
| CP07 | 0 | – | – | – | – | CP05, CP06, CP09 |
| CP08 | 0 | – | – | – | – | CP06, CP09 |
| CP09 | 0 | – | – | – | – | CP07, CP08 |
| CP10 | 0 | – | – | – | – | CP12, CP13 |
| CP11 | 1 | CP10, CP12, CP13, CP14, CP15, CP16, CP17, CP18, CP19, CP20, CP21, CP22, CP23 | CP12, CP13, CP14, CP15, CP16, CP17, CP18, CP19, CP20, CP21, CP22, CP23 | CP10 | – | CP03 |
| CP12 | 0 | – | – | – | – | CP10, CP13, CP14 |
| CP13 | 0 | – | – | – | – | CP10, CP12, CP15 |
| CP14 | 0 | – | – | – | – | CP12, CP15, CP16 |
| CP15 | 0 | – | – | – | – | CP13, CP14, CP17 |
| CP16 | 0 | – | – | – | – | CP14, CP17, CP18 |
| CP17 | 0 | – | – | – | – | CP15, CP16, CP19 |
| CP18 | 0 | – | – | – | – | CP16, CP19, CP20 |
| CP19 | 0 | – | – | – | – | CP17, CP18, CP21 |
| CP20 | 0 | – | – | – | – | CP18, CP21, CP22 |
| CP21 | 0 | – | – | – | – | CP19, CP20, CP23 |
| CP22 | 0 | – | – | – | – | CP20, CP23 |
| CP23 | 0 | – | – | – | – | CP21, CP22 |

FIG. 16
COMBINATION OF DISPLAY CONSTITUTIONAL ELEMENTS
(OUTPUT OF COMBINATION EXTRACTION UNIT 302)

| ELEMENT ID | ELEMENT TO BE COMBINED |
|---|---|
| CP01 | CP03, CP11 |
| CP02 | *CP01*, CP04, CP05 |
| CP03 | CP02, CP04, CP05, CP06, CP07, CP08, CP09, CP11 |
| CP04 | CP02, CP05, CP06 |
| CP05 | CP02, CP04, CP07 |
| CP06 | CP04, CP07, CP08 |
| CP07 | CP05, CP06, CP09 |
| CP08 | CP08, CP09 |
| CP09 | CP07, CP08 |
| CP10 | *CP01*, CP12, CP13 |
| CP11 | CP03, CP10, CP12, CP13, CP14, CP15, CP16, CP17, CP18, CP19, CP20, CP21, CP22, CP23 |
| CP12 | CP10, CP13, CP14 |
| CP13 | CP10, CP12, CP15 |
| CP14 | CP12, CP15, CP16 |
| CP15 | CP13, CP14, CP17 |
| CP16 | CP14, CP17, CP18 |
| CP17 | CP15, CP16, CP19 |
| CP18 | CP16, CP19, CP20 |
| CP19 | CP17, CP18, CP21 |
| CP20 | CP18, CP21, CP22 |
| CP21 | CP19, CP20, CP23 |
| CP22 | CP20, CP23 |
| CP23 | CP21, CP22 |

FIG. 17

COMBINATION OF BACKGROUND COLORS ON PAGE
(OUTPUT FROM COMBINATION CLASSIFYING UNIT 30)

| COLOR COMBINATION | | | |
|---|---|---|---|
| (R, G, B) | | (H, S, V) | |
| (255, 255, 255) | (255, 255, 255) | (0, 0, 100) | (0, 0, 100) |
| (255, 255, 255) | (222, 226, 224) | (0, 0, 100) | (150, 1, 88) |
| (255, 255, 255) | (0, 102, 51) | (0, 0, 100) | (150, 100, 40) |
| (102, 255, 51) | (255, 255, 255) | (105, 80, 100) | (0, 0, 100) |
| (102, 255, 51) | (102, 255, 51) | (105, 80, 100) | (105, 80, 100) |
| (222, 226, 224) | (102, 255, 51) | (150, 1, 88) | (105, 80, 100) |
| (222, 226, 224) | (222, 226, 224) | (150, 1, 88) | (150, 1, 88) |
| (222, 226, 224) | (0, 102, 51) | (150, 1, 88) | (150, 100, 40) |
| (0, 102, 51) | (102, 255, 51) | (150, 100, 40) | (105, 80, 100) |

FIG. 18

APPEARANCE RATIO OF COLOR COMBINATIONON ON PAGE
(OUTPUT FROM COMBINATION CLASSIFYING UNIT 30)

| COLOR COMBINATION | | | | APPEARANCE NUMBER | APPEARANCE RATIO |
|---|---|---|---|---|---|
| (R, G, B) | | (H, S, V) | | | |
| (255, 255, 255) | (255, 255, 255) | (0, 0, 100) | (0, 0, 100) | 7 | 13.5% |
| (255, 255, 255) | (222, 226, 224) | (0, 0, 100) | (150, 1, 88) | 11 | 21.2% |
| (255, 255, 255) | (0, 102, 51) | (0, 0, 100) | (150, 100, 40) | 4 | 7.7% |
| (102, 255, 51) | (255, 255, 255) | (105, 80, 100) | (0, 0, 100) | 9 | 17.3% |
| (102, 255, 51) | (102, 255, 51) | (105, 80, 100) | (105, 80, 100) | 7 | 13.5% |
| (222, 226, 224) | (102, 255, 51) | (150, 1, 88) | (105, 80, 100) | 9 | 17.3% |
| (222, 226, 224) | (222, 226, 224) | (150, 1, 88) | (150, 1, 88) | 1 | 1.9% |
| (222, 226, 224) | (0, 102, 51) | (150, 1, 88) | (150, 100, 40) | 2 | 3.8% |
| (0, 102, 51) | (102, 255, 51) | (150, 100, 40) | (105, 80, 100) | 2 | 3.8% |

FIG. 19

INSPECTION RESULT AND APPEARANCE RATIO
FOR EACH COLOR COMBINATION
(OUTPUT EXAMPLE FROM COMBINATION CLASSIFYING UNIT 30)

| COLOR COMBINATION | | | COLOR COMBINATION INSPECTION | | | | APPEARANCE NUMBER | APPEARANCE RATIO | APPEARANCE RATIO OF COMBINATIONS HAVING PROBLEM |
|---|---|---|---|---|---|---|---|---|---|
| (R, G, B) | | (H, S, V) | COLOR DIFFERENCE | SATURATION DIFFERENCE | BRIGHTNESS DIFFERENCE | BRIGHTNESS AND SATURATION | | | |
| (255, 255, 255) | (255, 255, 255) | (0, 0, 100) (0, 0, 100) | 0 | 0 | 0 | BRIGHTNESS 100 | 7 | 13.5% | 42.3% |
| (255, 255, 255) | (222, 226, 224) | (0, 0, 100) (150, 1, 88) | 150 | 1 | 12 | BRIGHTNESS ≧88 | 11 | 21.2% | |
| (255, 255, 255) | (0, 102, 51) | (0, 0, 100) (150, 100, 40) | 150 | 100 | 60 | — | 4 | 7.7% | |
| (102, 255, 51) | (255, 255, 255) | (105, 80, 100) (0, 0, 100) | 105 | 80 | 0 | BRIGHTNESS 100 | 9 | 17.3% | |
| (102, 255, 51) | (102, 255, 51) | (105, 80, 100) (105, 80, 100) | 0 | 0 | 0 | BRIGHTNESS AND SATURATION ≧80 | 7 | 13.5% | |
| (222, 226, 224) | (102, 255, 51) | (150, 1, 88) (105, 80, 100) | 45 | 79 | 12 | BRIGHTNESS ≧88 | 9 | 17.3% | |
| (222, 226, 224) | (222, 226, 224) | (150, 1, 88) (150, 1, 88) | 0 | 0 | 0 | BRIGHTNESS ≧88 | 1 | 1.9% | |
| (222, 226, 224) | (0, 102, 51) | (150, 1, 88) (150, 100, 40) | 0 | 99 | 48 | — | 2 | 3.8% | |
| (0, 102, 51) | (102, 255, 51) | (150, 100, 40) (105, 80, 100) | 45 | 20 | 60 | SATURATION ≧80 | 2 | 3.8% | |

SCREEN INSPECTION DEVICE, SCREEN INSPECTION METHOD, AND PROGRAM

CROSS REFERENCE TO RELATED APPLICATIONS

This is a National Stage of International Application No. PCT/JP2012/003786 filed Jun. 11, 2012, claiming priority based on Japanese Patent Application No. 2011-163564 filed Jul. 26, 2011, the contents of all of which are incorporated herein by reference in their entirety.

TECHNICAL FIELD

The present invention relates to a screen inspection device, a screen inspection method, and a program.

BACKGROUND ART

As a method and a device which inspect color combinations of screen data displayed on a screen, such as Web content, there are a method disclosed in Patent Document 1, aDesigner (product name: manufactured by IBM), and ColorSelector (product name: manufactured by Fujitsu). For example, a technology disclosed in Patent Document 1 analyzes structures of display elements contained in a document, calculates a difference in each color index (brightness, hue and saturation) of elements in which layers are adjacent with each other, and determines that the document lacks readability in a case where the difference is less than a predetermined threshold value.

As a mechanism which inspects harmony (beauty and comfort) of color combinations between display elements contained in the document and presents examples of appropriate color combinations, there is a method disclosed in Patent Document 2 or Patent Document 3. The method disclosed in Patent Document 2 uses a calculation algorithm to calculate whether, with respect to display colors of elements displayed on the screen, colors that the user sets satisfy sensitivity conditions that were set in advance by the user (which define a visual state represented by an entire document or an overall tone), and notifies the user of the calculated result.

There is a method disclosed in Patent Document 4, as a method having a mechanism to prevent eye fatigue, in a device which displays an image of a document, and the like. The method disclosed in Patent Document 4 prevents eye fatigue, by harmonizing automatically the brightness of the image and peripheral regions of the image, when the image is displayed by a projector, or the like.

RELATED DOCUMENT

Patent Document

[Patent Document 1] Japanese Unexamined Patent Publication No. 2002-197403
[Patent Document 2] Japanese Unexamined Patent Publication No. 08-249441
[Patent Document 3] Japanese Unexamined Patent Publication No. 2008-146227
[Patent Document 4] Japanese Patent No. 2903604

DISCLOSURE OF THE INVENTION

Some screens have undesirable color combinations which make a user feel tired and uncomfortable, even though the screens are harmonized to have high readability. An object of the present invention is to provide a screen inspection device, a screen inspection method, and a program capable of finding undesirable color combinations which make a user feel tired and uncomfortable.

According to the present invention, there is provided a screen inspection device including: a combination selecting unit which creates a plurality of element combinations of which each is a combination of two display elements, based on screen data including a plurality of display elements, and selects the element combinations in which a distance between the two display elements is equal to or less than a threshold value;

a combination classifying unit which selects the element combinations, in which any one of color difference, saturation difference and brightness difference, and both brightness and saturation of the color combination of the two display elements exceed respective predetermined threshold values, from the element combinations selected by the combination selecting unit, and calculates an appearance ratio for each color combination, the appearance ratio being a ratio of the number of the element combinations belonging to one of the color combinations to a total number of the element combinations selected by the combination selecting unit; and a screen determination unit which calculates the sum of the appearance ratios of the color combinations in which the appearance ratio exceeds a threshold value, and determines whether the calculated sum exceeds a threshold value.

According to the present invention, there is provided a screen inspection method including: causing a computer to create a plurality of element combinations of which each is a combination of two display elements, based on screen data including a plurality of display elements, and to select the element combinations in which a distance between the two display elements is equal to or less than a threshold value;

causing the computer to select the element combinations, in which any one of color difference, saturation difference and brightness difference, and both brightness and saturation of the color combination of the two display elements exceed respective predetermined threshold values, from the element combinations selected by the combination selecting unit, and to calculate an appearance ratio for each color combination, the appearance ratio being a ratio of the number of the element combinations belonging to one of the color combinations to a total number of the element combinations selected by the combination selecting unit; and causing the computer to calculate the sum of the appearance ratios of the color combinations in which the appearance ratio exceeds a threshold value, and to determine whether the calculated sum exceeds a threshold value.

According to the present invention, there is provided a program that causes a computer to function as a screen inspection device, the program causing the computer to execute: a function of creating a plurality of element combinations of which each is a combination of two display elements, based on screen data including a plurality of display elements, and selecting the element combinations in which a distance between the two display elements is equal to or less than a threshold value;

a function of selecting the element combinations, in which anyone of color difference, saturation difference and brightness difference, and both brightness and saturation of the color combination of the two display elements exceed respective predetermined threshold values, from the element combinations selected by the combination selecting unit, and calculating an appearance ratio for each color combination, the appearance ratio being a ratio of the number of the element combinations belonging to one of the color combinations to a total number of the element combinations selected by the combination selecting unit; and a function of calculating the sum of the appearance ratios of the color combinations in which the appearance ratio exceeds a threshold value, and determining whether the calculated sum exceeds a threshold value.

According to the present invention, it is possible to find undesirable color combinations which make a user feel tired and uncomfortable.

BRIEF DESCRIPTION OF THE DRAWINGS

These and other objects, features, and advantages of the invention will be apparent through reference to the description of preferred embodiments and accompanying drawings.

FIG. 14 is a diagram describing an example.

FIG. 15 is a diagram describing an example.

FIG. 16 is a diagram describing an example.

FIG. 17 is a diagram describing an example.

FIG. 18 is a diagram describing an example.

FIG. 19 is a diagram describing an example.

DESCRIPTION OF EMBODIMENTS

Figure 1:
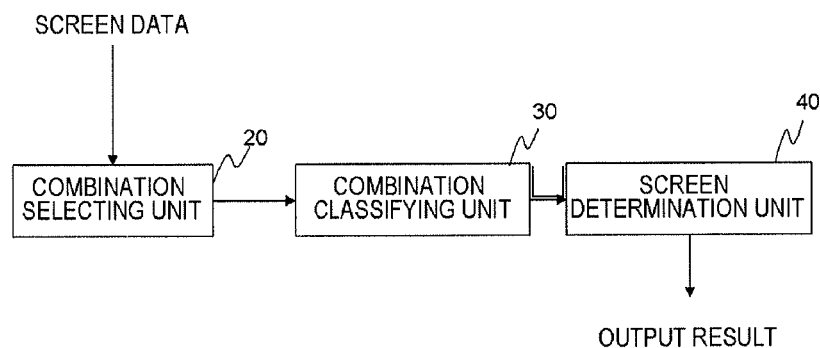
FIG. 1 is a block diagram illustrating a configuration of a screen inspection device according to a first embodiment.

Hereinafter, embodiments of the present invention will be described using the drawings. In the drawings, like display elements are denoted by like reference numerals, and thus an explanation thereof is not repeated.

First Embodiment

FIG. 1 is a block diagram illustrating a configuration of a screen inspection device 10 according to a first embodiment. The screen inspection device 10 includes a combination selecting unit 20, a combination classifying unit 30, and a screen determination unit 40. The combination selecting unit 20 creates a plurality of element combinations of which each is a combination of two display elements, based on screen data including a plurality of display elements. Then, the combination selecting unit 20 selects element combinations in which a distance between two display elements is equal to or less than a threshold value. The combination classifying unit 30 selects, among the element combinations, element combinations in which any one of color difference, saturation difference, brightness difference and both brightness and saturation of a color combination of the two display elements exceed respective predetermined threshold values. Then, the combination classifying unit 30 calculates an appearance ratio for each color combination. The appearance ratio is a ratio of the number of the element combinations belonging to the color combination to a total number of the element combinations created by the combination selecting unit 20. The screen determination unit 40 calculates a sum of the appearance ratios of the color combinations in which any one of color difference, saturation difference, brightness difference, and both brightness and saturation exceed the respective predetermined threshold values and in which the appearance ratios exceed a threshold value, and determines whether the calculated sum exceeds a threshold value. Then, the screen determination unit 40 determines that screen data in which the total value of the appearance ratios exceed the threshold value has undesirable color combinations which make a user feel tired and uncomfortable. The determination result is displayed, for example, on the display screen. Details of a function of each display element of the screen inspection device 10 will be described later using a flowchart.

In addition, each display element of the screen inspection device 10 shown in FIG. 1 does not illustrate a configuration in the hardware unit, but illustrates a block in a functional unit. Each display element of the screen inspection device 10 is implemented with any combination of hardware and software based on a CPU of any computer, a memory, a program loaded on the memory for implementing the display element in the figure, a storage unit such as a hard disk for storing the program, and an interface for network connection. In addition, various modification examples are available in implementing methods and devices.

FIGS. 2 to FIG. 6 are flowcharts illustrating an operation of the screen inspection device 10 shown in FIG. 1.

Figure 2:
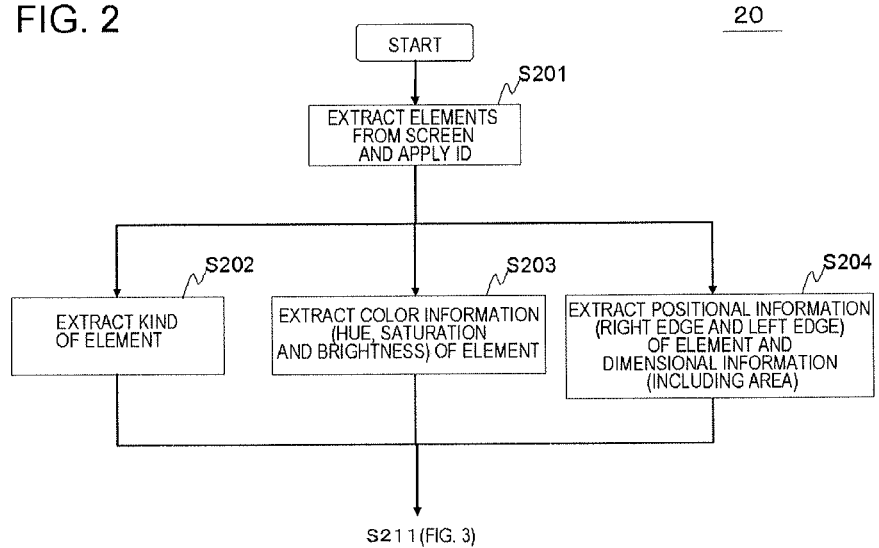
FIG. 2 is a flowchart illustrating an operation of the screen inspection device shown in FIG. 1.

First, as shown in FIG. 2, the combination selecting unit 20 obtains screen data. The screen data, for example, is stored in a storage unit that the screen inspection device 10 has. The combination selecting unit 20 extracts display elements that the screen has, for each page (screen), and applies identification information (ID) to each display element (step S201).

Then, for each display element, the combination selecting unit 20 recognizes the kind (for example, head and item label) of the display element and stores the recognized kind of display element in association with the ID of the display element (step S202). Further, for each display element, the combination selecting unit 20 recognizes color information (for example, hue, saturation and brightness) of the display element, and stores the recognized color information in association with the ID of the display element (step S203). Here, in a case where the color of the display element is specified in other formats such as, for example, RGB, the combination selecting unit 20 converts the color of the format into color information containing hue, saturation and brightness. Further, for each display element, the combination selecting unit 20 recognizes positional information and dimensional information of the left edge and the right edge of the display element, and stores the recognized kind in association with the ID of the display element (step S204). Here, the positional information is defined, for example, by taking the upper left corner as an origin.

Figure 3:
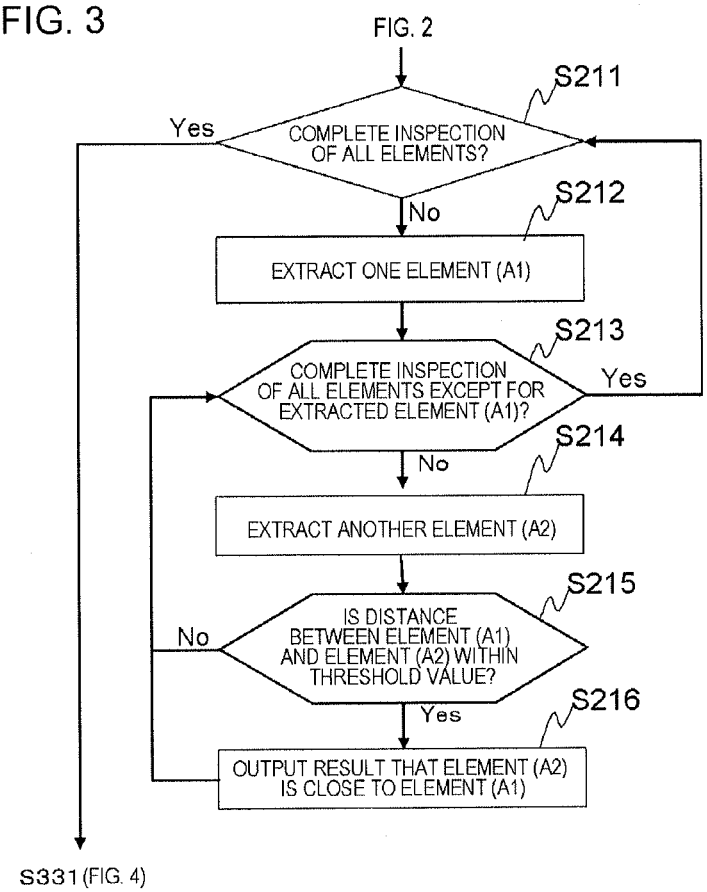
FIG. 3 is a flowchart illustrating an operation of the screen inspection device shown in FIG. 1.

Next, as shown in FIG. 3, the combination selecting unit 20 performs the following processes to all display elements (step S211: No).

First, the combination selecting unit 20 extracts any one display element (A1) (step S212). Then, until all display elements other than the display element A1 are selected (step S213: No), the combination selecting unit 20 selects another display element (A2) (step S214). Then, the combination selecting unit 20 obtains a distance between the display element A1 and the display element A2, based on positional information and dimensional information of the display element A1 and the display element A2, and determines whether the distance is equal to or less than the threshold value (step S215). In a case where the distance is equal to or less than the threshold value, the combination selecting unit 20 determines that the currently selected display element A1 and the display element A2 are close to each other (step S216). Then, in a case where the combination selecting unit 20 completes the selection of all remaining display elements as the display element A2 with respect to display element A1 (step S213: Yes), the combination selecting unit 20 changes the display element A1 (steps S211 and 212). That is, the combination selecting unit 20 performs a determination in steps S215 and S216 to a combination of all display elements.

Figure 4:
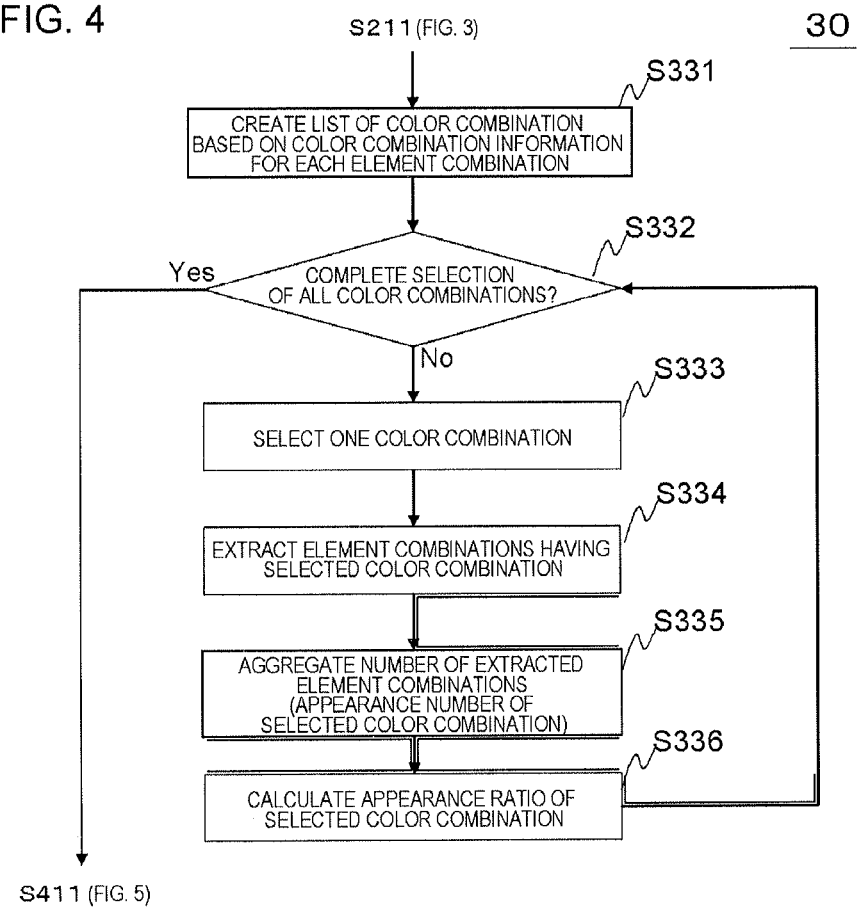
FIG. 4 is a flowchart illustrating an operation of the screen inspection device shown in FIG. 1.

Next, as shown in FIG. 4, the combination classifying unit 30 extracts color information among attribute information of the display element, with respect to the combination (hereinafter, referred to as element combination) of two display elements that are determined to be close to each other in step S216 of FIG. 3. Then, the combination classifying unit 30 creates color combination information in the element combination, based on the extracted color information. Then, the combination classifying unit 30 makes a list of the color combinations of the element combinations of the screen, based on the created color combination information (step S331).

Then, the combination classifying unit 30 performs the following process to all of the color combinations contained in the list made in step S331 (step S332).

First, the combination classifying unit 30 selects one color combination among the list (step S333). Next, the combination classifying unit 30 extracts the element combinations having the selected color combination (step S334), and aggregates the number of the extracted element combinations (step S335). Further, the combination classifying unit 30 calculates the ratio of the aggregate number of the aggregated color combinations to the total number of the element combinations that are determined to be close to each other in step S216, as an appearance ratio (step S336).

Figure 5:
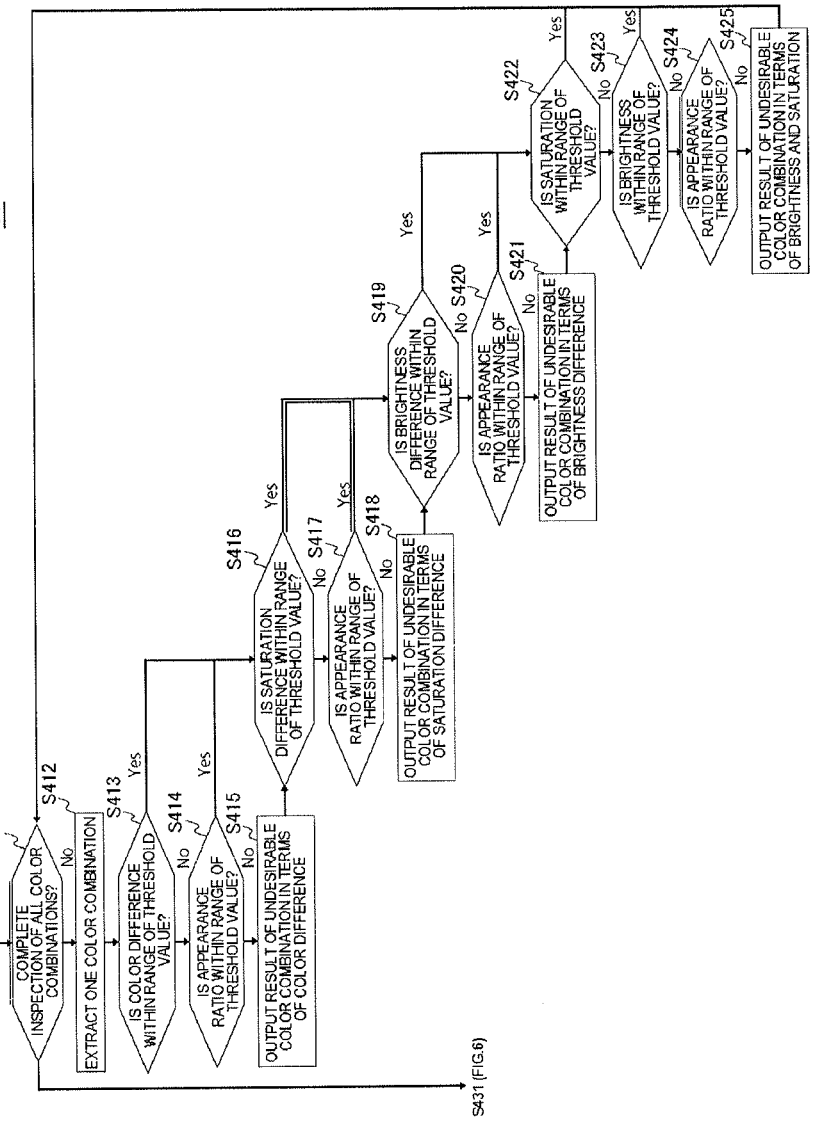
FIG. 5 is a flowchart illustrating an operation of the screen inspection device shown in FIG. 1.

Next, as shown in FIG. 5, the combination classifying unit 30 performs the following processes to all color combinations.

First, the combination classifying unit 30 selects a color combination that is not yet selected (step S412). Then, the combination classifying unit 30 compares the color difference of the selected color combination with the threshold value that is held in advance (step S413). In a case where the color difference exceeds the threshold value (step S413: No), the combination classifying unit 30 compares the appearance ratio (calculated in step S336) of the currently being selected color combination with the threshold value that is held in advance (step S414). In a case where the appearance ratio exceeds the threshold value (step S414: No), the combination classifying unit 30 outputs the determination result that the currently being selected color combination is an undesirable color combination in terms of the color difference (step S415).

In a case where the color difference is equal to or less than the threshold value (step S413: No) and where after the combination classifying unit 30 has performed the process shown in steps S414 or S415, the combination classifying unit 30 compares the saturation difference of the selected color combination with the threshold value that is held in advance (step S416). In a case where the saturation difference exceeds the threshold value (step S416: No), the combination classifying unit 30 compares the appearance ratio (calculated in step S336) of the currently being selected color combination with the threshold value that is held in advance (step S417). Here, the threshold value may be the same as or may be different from the threshold value in step S414. In a case where the appearance ratio exceeds the threshold value (step S417: No), the combination classifying unit 30 outputs the determination result that the currently being selected color combination is the undesirable color combination in terms of the saturation difference (step S418).

In a case where the saturation difference is equal to or less than the threshold value (step S413: No) and where after the combination classifying unit 30 has performed the process shown in steps S417 or S418, the combination classifying unit 30 compares the brightness difference of the being selected color combination with the threshold value that is held in advance (step S419). In a case where the brightness difference exceeds the threshold value (step S419: No), the combination classifying unit 30 compares the appearance ratio (calculated in step S336) of the currently being selected color combination with the threshold value that is held in advance (step S420). Here, the threshold value may be the same as or may be different from the threshold value in at least any one of steps S414 and S417. In a case where the appearance ratio exceeds the threshold value (step S420: No), the combination classifying unit 30 outputs the determination result that the currently being selected color combination is the undesirable color combination in terms of the brightness difference (step S421).

In a case where the brightness difference is equal to or less than the threshold value (step S419: No) and where after the combination classifying unit 30 has performed the process shown in steps S420 and S421, the combination classifying unit 30 performs the following processes. That is, when in the being selected color combination, the saturation thereof exceeds the threshold value that is held in advance (step S422: No), and the brightness thereof exceeds the threshold value that is held in advance (step S423: No), the combination classifying unit 30 compares the appearance ratio (calculated in step S336) of the currently being selected color combination with the threshold value that is held in advance (step S420). Here, the threshold value may be the same as or may be different from the threshold value in at least any one of steps S414, S417 and S420. In a case where the appearance ratio exceeds the threshold value (step S424: No), the combination classifying unit 30 outputs the determination result that the currently being selected color combination is the undesirable color combination in terms of both the brightness and the saturation (step S425).

In addition, the order of the process shown in steps S413 to S415, steps S416 to S418, steps S419 to S421, and steps S422 to S425 may be interchanged as appropriate.

Figure 6:
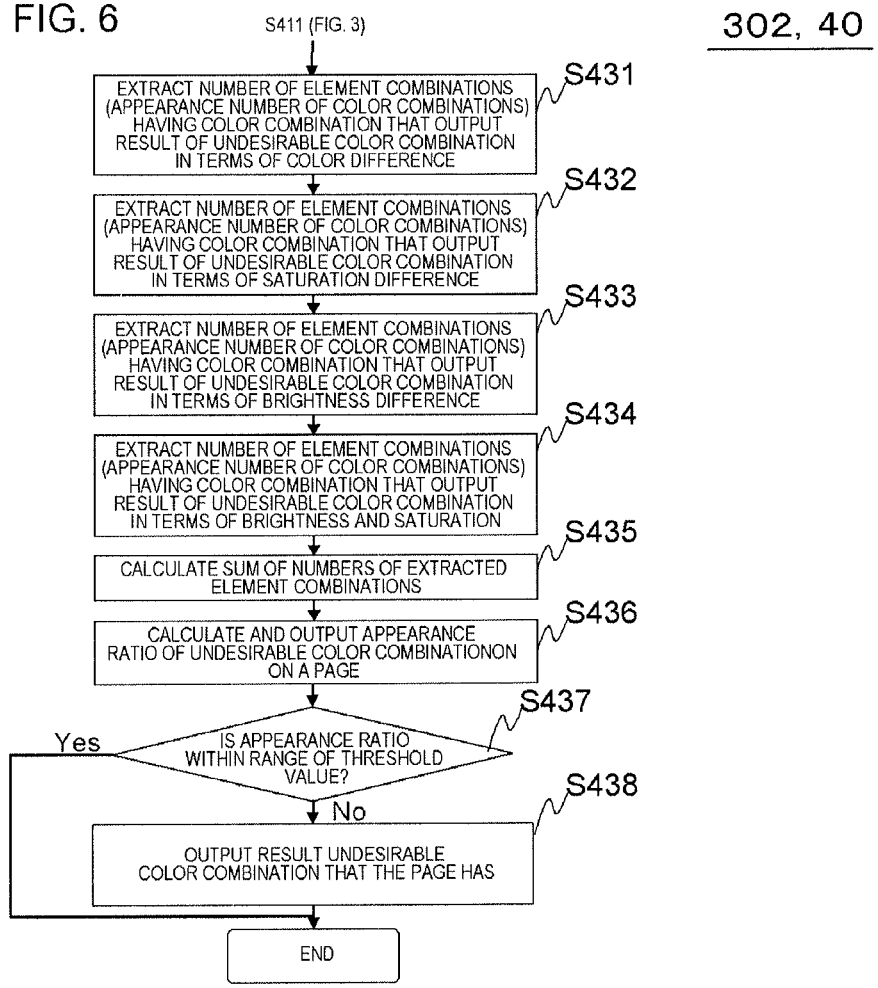
FIG. 6 is a flowchart illustrating an operation of the screen inspection device shown in FIG. 1.

Next, as shown in FIG. 6, the combination classifying unit 30 extracts the number of the element combinations having the color combination selected in step S415 (step S431). Further, the combination classifying unit 30 extracts the number of the element combinations having the color combination selected in step S418 (step S432). Further, the combination classifying unit 30 extracts the number of the element combinations having the color combination selected in step S421 (step S433). Further, the combination classifying unit 30 extracts the number of the element combinations having the number of the color combinations selected in step S425 (step S434). Then, the combination classifying unit 30 calculates the sum of the numbers of the element combinations extracted in steps S431 to S434 (step S435), and calculates the appearance ratio by dividing the calculated sum by the total number of the element combinations that are determined to be close to each other in step S216 (step S436).

In addition, the order of the process shown in steps S431 to S434 may be interchanged as appropriate.

Further, instead of the process shown in step S431 to step S436, the combination classifying unit 30 may calculate the sum of the appearance ratios of the element combinations having the color combination selected in step S415, the appearance ratio of the color combination selected in step S415, the appearance ratio of the color combination selected in step S418, the appearance ratio of the color combination selected in step S421, and the appearance ratio of the color combination selected in step S425.

Then, in a case where the appearance ratio calculated by the combination classifying unit 30 in step S436 exceeds the threshold value (step S437: Yes), the screen determination unit 40 determines that the screen data has the undesirable color combination, and outputs the determination result (step S438).

As described above, according to the present embodiment, it is possible to find screen data having color combinations which cause undesirable effects such as discomfort and fatigue of the user, from screen data such as web content that is displayed on a screen of a personal computer. Further, in the present embodiment, the color combinations in which the color difference, the saturation difference, the brightness difference, or both the saturation and the brightness exceed the threshold value are selected, and the color combinations in which the appearance ratio of the element combinations having the selected color combination exceeds the threshold value are selected. Then, the selected result is output (displayed). Therefore, it is possible to make the user recognize a portion to be corrected.

Second Embodiment

Figure 7:
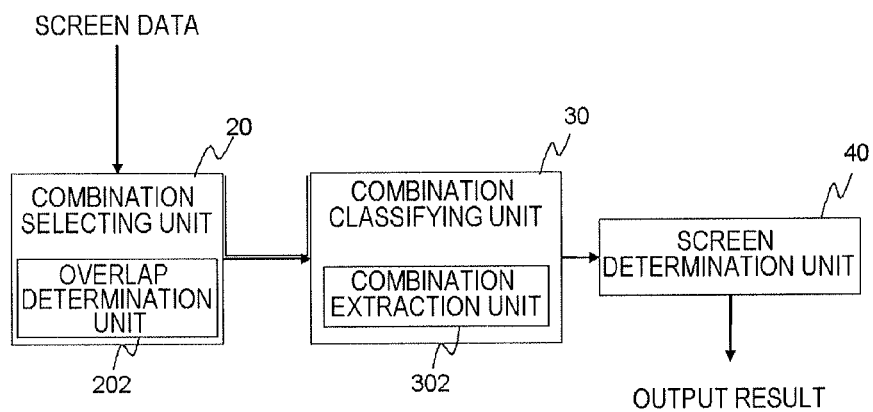
FIG. 7 is a block diagram illustrating a configuration of a screen inspection device according to a second embodiment.

FIG. 7 is a block diagram illustrating a functional configuration of a screen inspection device 10 according to a second embodiment. The screen inspection device 10 according to the present embodiment has the same configuration as the screen inspection device 10 according to the first embodiment, except for having an overlap determination unit 202 and a combination extraction unit 302.

The overlap determination unit 202 analyzes an overlap between display elements, and classifies overlap schemes for two elements that overlap most closely, into the following four patterns: A first pattern is that the entirety of an upper display element overlaps a part of a lower display element without contacting the side thereof. A second pattern is that the entirety of the upper display element overlaps apart of the lower display element with contacting the side thereof. A third pattern is that a part of the upper display element overlaps a part of the lower display element. A fourth pattern is that the upper display element overlaps the entirety of the lower display element with hiding it.

With respect to the element combination in which it is determined that two display elements overlap in the first pattern, the combination extraction unit 302 outputs a combination of the two display elements. With respect to the element combination in which it is determined that two display elements overlap in the second pattern or the third pattern, the combination extraction unit 302 outputs a combination of the upper display element and a further lower display element of the lower display element, in addition to the combination of the two display elements. With respect to the element combination in which it is determined that two display elements overlap in the fourth pattern, the combination extraction unit 302 outputs a combination of the upper display element and a further lower display element of the lower display element. Further, in a case where there are a plurality of elements in which it is determined by the overlap determination unit 202 that the elements overlap any display element (or the lower element) most closely (immediately above), the combination extraction unit 302 uses these elements as the subjects to create the combination configured of two elements, and outputs the combination in which the distance between the two elements is equal to or less than the threshold value.

Next, an operation of the screen inspection device 10 shown in FIG. 7 will be described using FIG. 8, FIG. 9, and FIG. 10.

Figure 8:
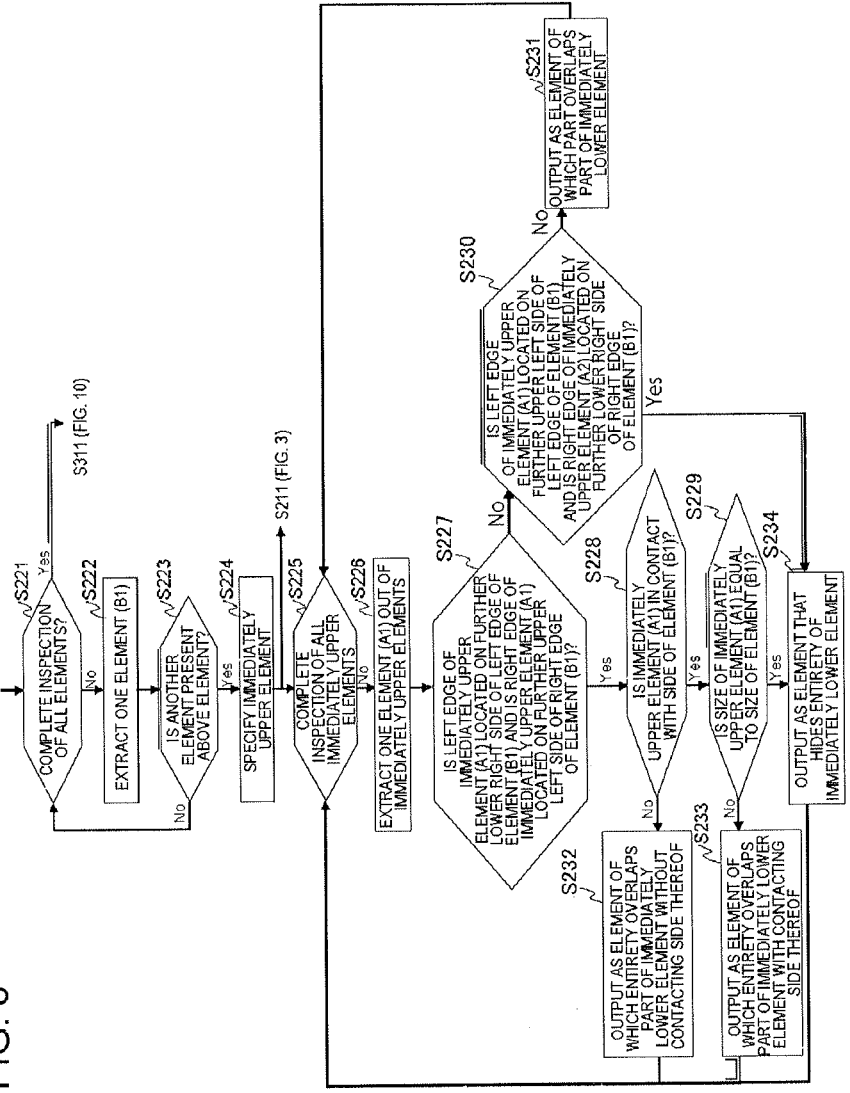
FIG. 8 is a flowchart illustrating an operation of the screen inspection device shown in FIG. 7.

As shown in FIG. 8, after the combination selecting unit 20 performs the process shown in FIG. 2, the overlap determination unit 202 of the combination selecting unit 20 performs the following process (step S221), until all display elements are selected.

First, the overlap determination unit 202 selects a display element B1 among the display elements (step S222). Next, the overlap determination unit 202 determines whether there is another display element to be overlapped above the display element B1, based on the positional information and the dimensional information of the being selected display element B1 and the positional information and the dimensional information of other display elements (step S223). In a case where there is another display element being overlapped, the overlap determination unit 202 specifies another display element that overlaps the display element B1 most closely (being immediately above) (step S224).

Then, the combination selecting unit 20 performs the process shown in FIG. 3 by using the elements that are specified in step S224 to be immediately above the display element B1, as a parent set.

Further, the overlap determination unit 202 selects a display element A1 from the display elements specified in step S224 (steps S225 and S226), and determines whether the left edge of the display element A1 overlaps the left edge of the display element B1 or is located on the further lower right side of the screen, and the right edge of the display element A1 overlaps the right edge of the display element B1 or is located on the further upper left side of the screen, based on the positional information and the dimensional information of the display element B1 and the display element selected in step S226 (step S227). In a case where the left edge of the display element A1 overlaps the left edge of the display element B1 or is located on the further lower right side of the screen, and the right edge of the display element A1 overlaps the right edge of the display element B1 or is located on the further upper left side of the screen (step S227: Yes), the overlap determination unit 202 determines whether any one of four sides of the display element A1 is in contact with any one of four sides of the display element B1 (step S228). In a case where any one of four sides of the display element A1 is not in contact with any one of four sides of the display element B1 (step S228: No), the overlap determination unit 202 outputs the display element A1 as the display element (FIG. 9(a)) in which the entirety of the display element overlaps a part of the display element B1 without contacting the side thereof (step S232).

Further, in a case where any one of four sides of the display element A1 is in contact with any one of four sides of the display element B1, the overlap determination unit 202 determines whether the size of the display element A1 is equal to the size of the display element B1 (step S229). In a case where the sizes of two display elements are different from each other (step S229: No), the overlap determination unit 202 outputs the display element A1 as the display element (FIG. 9(b)) in which the entirety of the display element overlaps a part of the display element B1 with contacting the side thereof (step S233).

In a case where the sizes of two display elements are equal to each other (step S229: Yes), the overlap determination unit 202 outputs the display element A1 as the display element which overlaps the display element B1 with hiding it (step S234).

Here, a first condition is that the left edge of the display element A1 is located on the further lower right side of the screen than the left edge of the display element B1, and a second condition is that the right edge of the display element A1 is located on the further upper left side of the screen than the right edge of the display element B1. In a case where at least one of the first condition and the second condition is not satisfied (step S227: No), the overlap determination unit 202 determines whether the left edge of the display element A1 is located on the further upper left of the screen than the left edge of the display element B1 and the right edge of the display element A1 is located on the further lower right side of the screen than the right edge of the display element B1 (step S230). In a case where the left edge of the display element A1 is located on the further upper left side of the screen than the left edge of the display element B1 and the right edge of the display element A1 is located on the further lower right of the screen than the right edge of display element B1 (step S230: Yes), the overlap determination unit 202 outputs the display element A1 as the display element (FIG. 9(d)) which overlaps the display element B1 with hiding it (step S234). In a case where the condition is not satisfied (step S230: No), the overlap determination unit 202 outputs the display element A1 as the display element (FIG. 9(c)) in which a part of the display element overlaps a part of the lower element (step S231).

Figure 10:
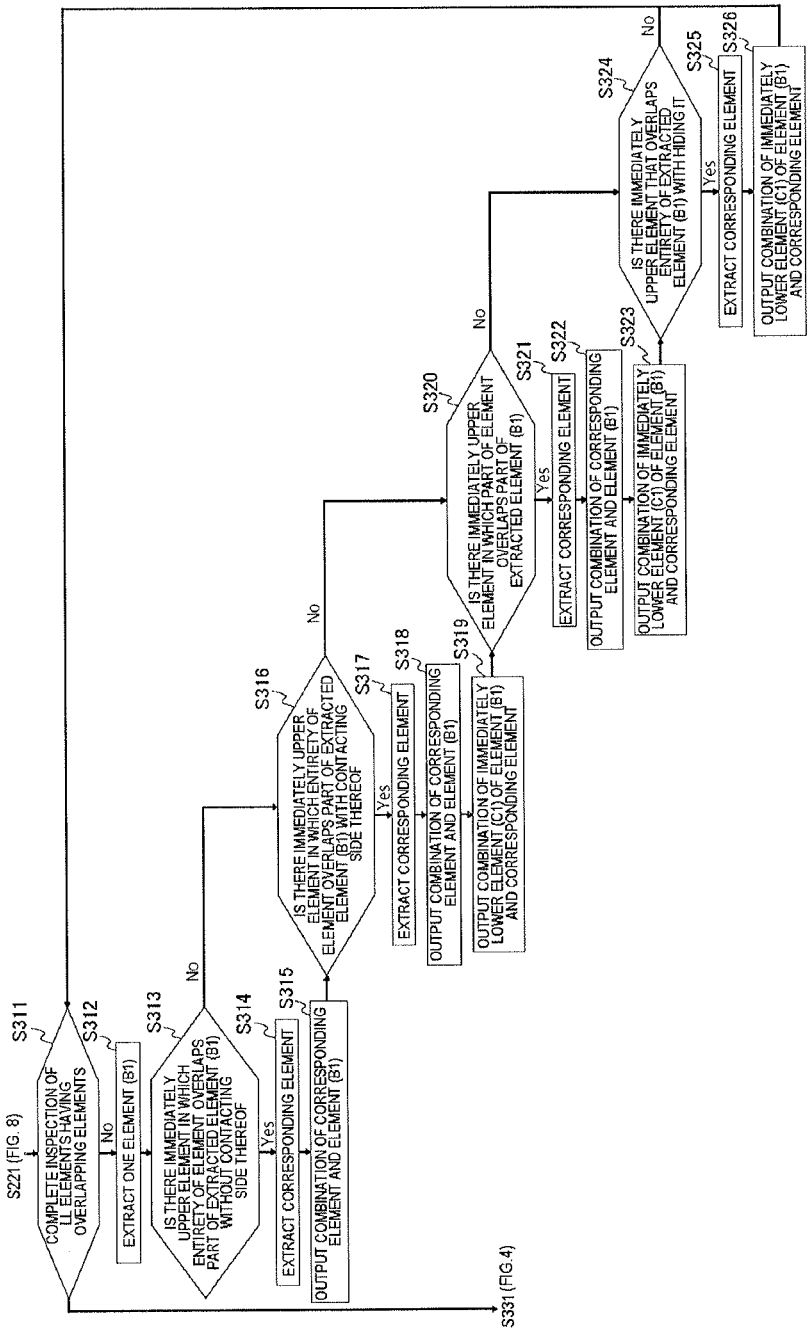
FIG. 10 is a flowchart illustrating an operation of the screen inspection device shown in FIG. 7.

If the overlap determination unit 202 of the combination selecting unit 20 performs the process shown in FIG. 8 until all display elements are selected, the combination extraction unit 302 of the combination classifying unit 30 performs the process shown in FIG. 10 to the all display elements in which it is determined by the overlap determination unit 202 that there are overlaps (step S311).

First, the combination extraction unit 302 selects a display element B1 that is not yet selected (step S312). Next, the combination extraction unit 302 determines, based on the output result of the overlap determination unit 202, whether there is the display element which overlaps the display element B1 and in which the entirety of the display element is not contact with the side of a part of the display element B1 (step S313). In a case where there is the corresponding display element (step S313: Yes), the combination extraction unit 302 extracts the corresponding display element (step S314), and creates and outputs a combination of the extracted display element and the display element B1 (step S315).

Further, in a case where there is no corresponding display element (step S313: No), after step S315, the combination extraction unit 302 determines whether there is a display element which overlaps the display element B1 and in which the entirety of the display element is in contact with the side of a part of the display element B1 (step S316). In a case where there is the corresponding display element (step S316: Yes), the combination extraction unit 302 extracts the display element (step S317), and then outputs, in addition to the combination of the display element and the display element B1 (step S318), a combination of a further lower element (an element located immediately below) of the display element B1 and the display element extracted in step S317 (step S319).

Further, in a case where there is no corresponding display element (step S316: No), after step S319, the combination extraction unit 302 determines whether there is a display element which overlaps the display element B1 and in which a part of the display element overlaps a part of the display element B1 (step S320). In a case where there is a corresponding display element (step S320: Yes), the combination extraction unit 302 extracts the corresponding display element (step S321), and then outputs, in addition to the combination of the display element and the display element B1 (step S322), a combination of a further lower element (the element located immediately below) of the display element B1 and the display element extracted in step S321 (step S323).

Further, in a case where there is no corresponding display element (step S320: No), after step S323, the combination extraction unit 302 determines whether there is a display element which overlaps the display element B1 and in which the display element hides the entirety of the display element B1 (step S324). In a case where there is a corresponding display element (step S324: Yes), the combination extraction unit 302 extracts the corresponding display element (step S325), and then outputs a combination of a further lower element (the element located immediately below) of the display element B1 and the display element extracted in step S325 (step S326).

Then, the combination extraction unit 302 outputs a combination in which it is determined by the combination selecting unit 20 that the distance between elements is equal to or less than the threshold value, among the combinations of elements in which it is determined by the overlap determination unit 202 that the elements overlap the display element B1 most closely (immediately above).

In addition, S313 to S315, S316 to S319, S320 to S323, and S324 to S326 may be performed by changing the order.

Then, the combination classifying unit 30 and the screen determination unit 40 perform the processes shown in FIG. 4, FIG. 5, and FIG. 6, with respect to an element combination that the combination extraction unit 302 outputs. Further, the combination classifying unit 30 also performs the processes shown in FIG. 4, FIG. 5, and FIG. 6, with respect to an element combination that is output by the process shown in FIG. 3.

According to the present embodiment, it is possible to achieve the same effect as the first embodiment. Further, in a case where, among display elements that overlap with each other, it is determined that the overlap scheme thereof is that the entirety of the upper display element overlaps a part of the lower display element without contacting the side thereof, the combination extraction unit 302 of the screen inspection device 10 outputs the combination of the two display elements. Further, in a case where it is determined that the entirety of the upper display element overlaps apart of the lower display element with contacting the side thereof and a part of the upper display element overlaps apart of the lower display element, the combination extraction unit 302 outputs, in addition to the combination of the two display elements, a combination of a further lower display element of the lower display element and the upper display element. Further, in a case where it is determined that the upper display element overlaps the entirety of the lower display element with hiding it, the combination extraction unit 302 outputs the combination of a further lower display element of the lower display element and the upper display element. Further, the combination extraction unit 302 outputs a combination of two elements in which it is determined by the combination selecting unit 20 that the display elements are close to each other (that is, the distance between the display elements is equal to or less than the threshold value), among display elements which overlap most closely, for the display element in which it is determined by the overlap determination unit 202 that there is an overlap. Accordingly, even in a case where there is an overlap of display elements constituting a screen and there is a difference between a proximity relationship of the display elements itself and a proximity relationship that is visible to the user, it is possible to perform the inspection of color combination based on the proximity relationship that is visible to the user. This enables to find a problem of a color combination with higher accuracy which causes undesirable effects such as fatigue and discomfort of the user.

Third Embodiment

Figure 11:
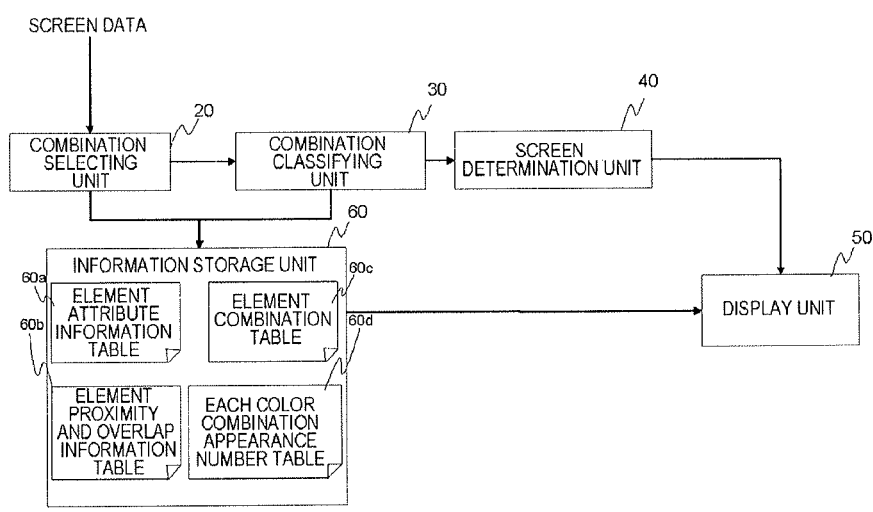
FIG. 11 is a block diagram illustrating a configuration of a screen inspection device according to a third embodiment.

FIG. 11 is a block diagram illustrating a functional configuration of a screen inspection device 10 according to a third embodiment. The screen inspection device 10 according to the present embodiment has the same configuration as the screen inspection device 10 according to the first embodiment except for having a display unit 50 and a information storage unit 60. The information storage unit 60 records and holds attribute information (an element attribute information table 60a) for each display element that is output from the combination selecting unit 20 and the combination classifying unit 30, information (an element combination table 60c) for specifying an element combination, information for indicating a proximity and an overlap of display elements (an element proximity and overlap information table 60b), an appearance number (an appearance number table 60d for each color combination), and an appearance ratio (an each color combination appearance number table 60d). The display unit 50 displays information output from the screen determination unit 40. Further, the display unit 50 extracts, from the information stored in the information storage unit 60, information for specifying element combinations corresponding to color combinations that are determined to be undesirable in the combination classifying unit 30, and the attribute information of the display elements constituting the element combinations, and displays the extracted information in order for the user to know the information.

According to the present embodiment, it is possible to achieve the same effect as the first embodiment. Further, it is possible to show the user the color combinations that are determined to be the undesirable color combinations and information for specifying the element combinations having those color combinations. By so doing, the user can rapidly specify the elements in screen data in which color combinations should be modified, and easily perform a modification operation. In addition, the second embodiment may include the display unit 50 and the information storage unit 60 shown in the present embodiment.

Fourth Embodiment

Figure 12:
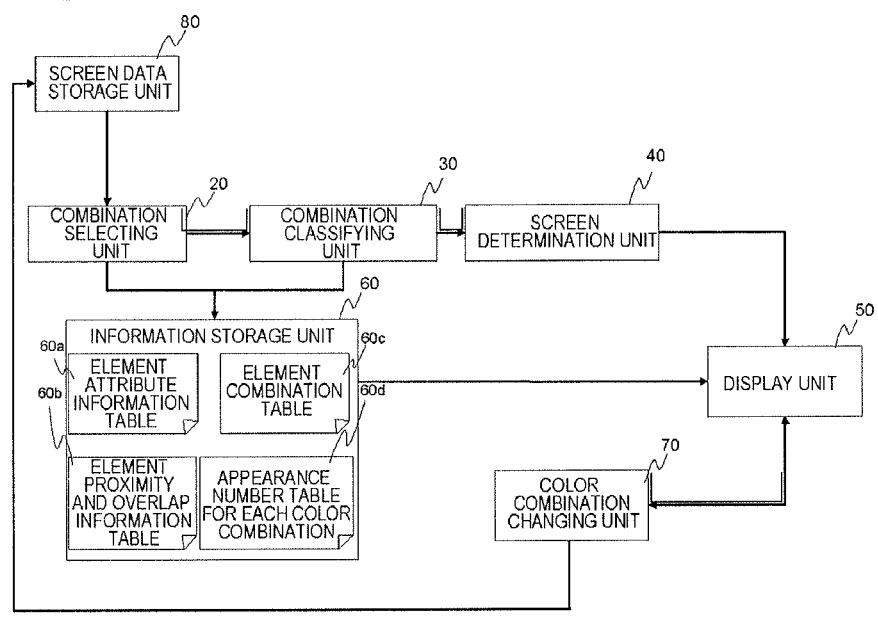
FIG. 12 is a block diagram illustrating a configuration of a screen inspection device according to a fourth embodiment.

FIG. 12 is a block diagram illustrating a functional configuration of a screen inspection device 10 according to a fourth embodiment. The screen inspection device 10 according to the present embodiment has the same configuration as the screen inspection device 10 according to third embodiment, except for having a color combination changing unit 70 and a screen data storage unit 80.

The color combination changing unit 70 changes the color combination of display elements constituting element combinations displayed on the display unit 50, in response to the input from the user of the screen inspection device 10. After the color combination data is changed, screen data is immediately displayed on the display unit 50. The screen data storage unit 80 stores the screen data, and outputs the screen data to the combination selecting unit 20. Further, the screen data storage unit 80 updates screen data according to an instruction from the color combination changing unit 70.

Even by the present embodiment, it is possible to achieve the same effect as the third embodiment. Further, based on the screen inspection result, it is possible to change color combinations on the screen on the spot. Accordingly, the change operation of the color combination is performed smoothly. In addition, the second embodiment may include the display unit 50, the information storage unit 60, the color combination changing unit 70, and screen data storage unit 80, which are shown in the present embodiment.

Example

By taking the screen shown in FIG. 13 as an example, for example, with respect to "ease of eyestrain", the operation of the inspection of color combination by the screen inspection device 10 in the second embodiment will be described. First, with respect to the screen data for displaying the screen shown in FIG. 13, the combination selecting unit 20 analyzes attributes such as background colors, kinds, positions and sizes of constitutional elements of a page (screen) (steps S201 to S204 in FIG. 2), and outputs the list of the attribute information for each constitutional element (FIG. 14).

Further, the overlap determination unit 202 of the combination selecting unit 20 selects one display element from the display elements (steps S221 to S222 in FIG. 8), and based on positional information and dimensional information of the display screen of the selected display element, determines whether there is another display element to be overlapped on the display element (step S223 in FIG. 8). Then, in a case where there is the display element to be overlapped, the overlap determination unit 202 specifies (step S224 in FIG. 9) and outputs (FIG. 15) another display element which overlaps most closely (located immediately above).

Figure 13:
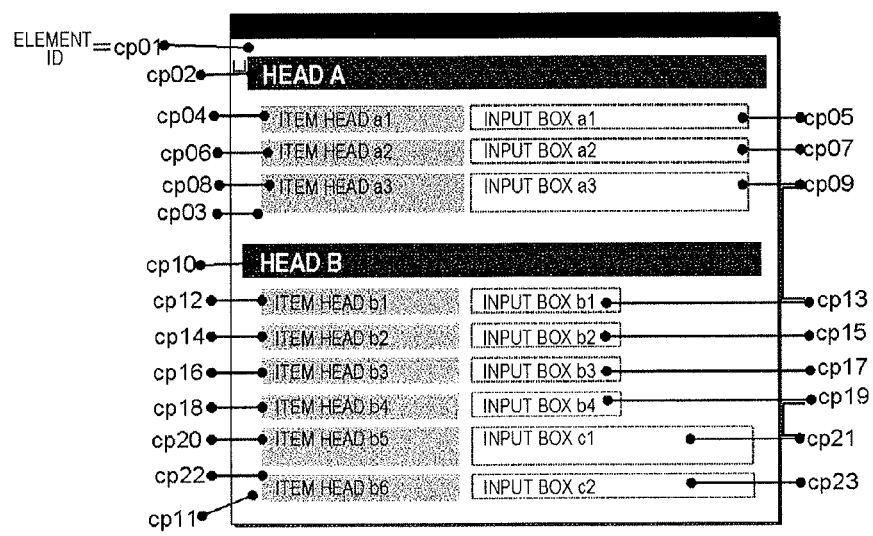
FIG. 13 is a diagram describing an example.

For example, as shown in FIG. 14, CP03 in FIG. 13 is located in the position (top30, left30) of the display element and has the size (height270, width820), whereas CP02, CP04, CP05, CP06, CP07, CP08 and CP09 among other display elements are all located in the further lower right position of CP03 or in the same position as CP03. Further, CP02, CP04, CP05, CP06, CP07, CP08, and CP09 have sizes (height<=270, width<=820). For this reason, it is determined that there are other display elements to be overlapped on CP03.

Then, for CP02, CP04, CP05, CP06, CP07, CP08, and CP09 that are determined to be overlapped on CP03, it is determined whether there is another display element to be overlapped for each display element (steps S222 to S223 in FIG. 8). In the present example, since it is determined that there is no display element to be overlapped for any display element, the overlapped elements located immediately above CP03 are specified as CP02, CP04, CP05, CP06, CP07, CP08, and CP09. Then, as in CP03 of FIG. 15, it is output that the overlapped element: presence (1), and elements located immediately above: CP02, CP04, CP05, CP06, CP07, CP08, and CP09.

Next, the overlap determination unit 202 of the combination selecting unit 20 selects one display element among display elements that are overlapped immediately above the selected display element (steps S225 to S226 in FIG. 8), and calculates and outputs an overlap scheme of the selected display element and the element that overlaps the display element, based on the positional information and the dimensional information of the two display elements (steps S227 to S231 in FIG. 8). In a case of CP02 that is output as the display element located immediately above CP03 of FIG. 14, as in FIG. 14, if the upper left position (top30, left30) and the lower right position (down80, right850) of CP02 are respectively compared with the upper left position (top30, left30) and the lower right position (down300, right850) of CP03, the left edge of CP02 is equal to the left edge of CP03, and the right edge of CP02 is located at the same position as the right edge of CP03 in the lateral direction and is located at a further upper part of the screen in the longitudinal direction (step S227 in FIG. 8), since the positions of CO02 and CO03 are equal at (top30, left30) and (right850), CP02 is contacted with CO03 in three sides, that is, a left side, an upper side and a right side out of four sides (S228 in FIG. 8), and since the size (height50, width820) of CP02 is smaller than the size (height270, width820) of CP03 (S229 in FIG. 8), CP02 is output as an element that overlaps a part of CP03 with contacting the side thereof (FIG. 9(b)) (step S233 in FIG. 8).

Figure 9:
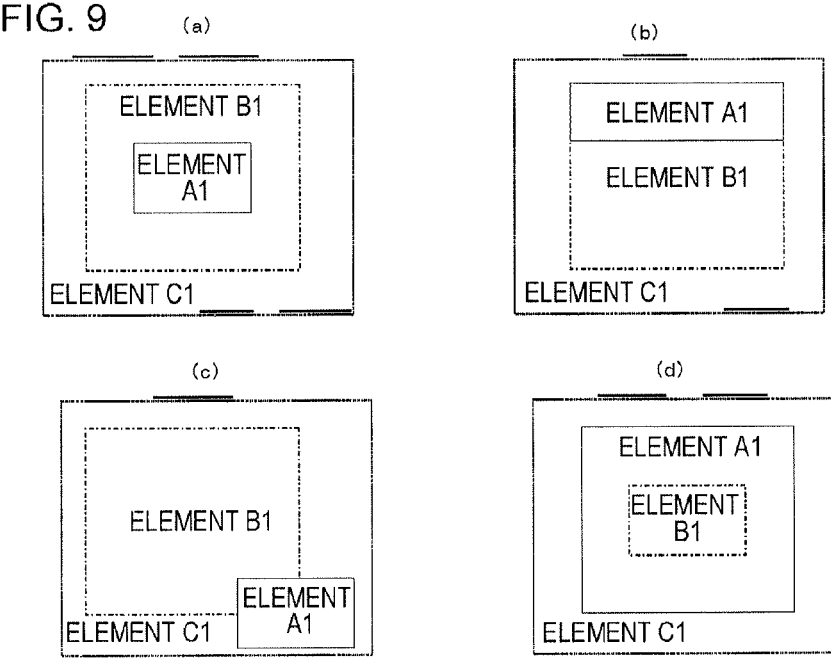
FIG. 9 is a diagram describing an operation of the screen inspection device shown in FIG. 7.

Thereafter, returning to step S225 in FIG. 9, an overlap scheme of CP03 and another element 04 that is output as an element located immediately above CP03 is analyzed. As in FIG. 14, CP04 is located in the upper left position (top110, left50) and the lower right position (down150, right370), if the upper left position (top30, left30) and the lower right position (down300, right850) of CP03 are compared with CP04, the left edge of CP04 is located in the further lower right part than the left edge of CP03, and the right edge of CP04 is located in the further upper left part than the right edge of CP03 (S227 in FIG. 8). Further, since all values in top/down and left/right of CP04 are different from CP03, CP04 is not in contact with the side of CP03 (step S228 in FIG. 8). From the above, CP04 is output as an element (FIG. 9(a)) in which the entirety of the element overlaps a part of CP03 without contacting the side thereof (step S232 of FIG. 8).

In this manner, the operations from step S225 to S231 are repeated until the inspection of all display elements that are overlapped immediately above CP03 is completed.

Subsequently, for the display element in which it is determined by the overlap determination unit 202 that there is an overlap, the combination selecting unit 20 extracts two display elements (steps S211 to S214 in FIG. 3) by taking the display elements that overlap most closely (immediately above) as subjects, obtains the distance between the display elements based on the positional information and the dimensional information, and determines that the two display elements are close in a case where the distance is within the range of the threshold value (step S216 in FIG. 3) by comparing the distance with the held threshold value (step S215 in FIG. 3).

For example, CP02 and CP04 are extracted among CP02, CP04, CP05, CP06, CP07, CP08, and CP09 that are determined as display elements located immediately above CP03 in FIG. 13, (S211 to S214 in FIG. 3), then in view of the left upper position (top30, left30), the right lower position (down80, right850), and the size (height50, width820) of CP02, and the left upper position (top110, left50), the right lower position (down150, right370), and the size (height40, width320) of CP04, it is known that CP04 is arranged in the further lower right part than CP02 and has narrower width than CP02, then down80 of CP02 is subtracted from top110 of CP04 located in the lower part to obtain 30 as a distance in the vertical direction, and then 30 is compared with the held threshold value (for example "the distance between two elements is assumed to be equal to or less than 50 px") (S215 in FIG. 3). Since the distance between CP02 and CP04 is within the range of the threshold value, CP02 and CP04 are output as display elements that are close to each other (step S216 of FIG. 3). The operations from S211 to S216 are repeated until the inspection of all elements that are overlapped immediately above CP03 is completed.

Next, the extraction operation of the combination of display elements will be described by taking the screen of FIG. 13 as an example. The combination extraction unit 302 selects CP03 as a display element that is not yet selected, among elements in which it is determined by the overlap determination unit 202 that there is an overlap (S311 to S312 of FIG. 10), and determines, based on the output result of the overlap determination unit 202, whether there is an element in which the entirety of the element overlaps a part of the selected element without contacting the side thereof, out of elements: CP02, CP04, CP05, CP06, CP07, CP08, and CP09 that are overlapped immediately above CP03 (step S313 of FIG. 10). Since CP04, CP05, CP06, CP07, CP08, and CP09 correspond to the determination condition, as shown in FIG. 16, the combinations of these elements and CP03 are output: (CP03, CP04) (CP04, CP05) (CP03, CP06) (CP03, CP07) (CP03, CP08) and (CP03, CP09) (steps S314 to S315 of FIG. 10).

Subsequently, the combination extraction unit 302 determines whether there is an element in which the entirety of the display element overlaps a part of the selected element with contacting the side thereof, out of display elements that are overlapped immediately above CP03 (step S316 of FIG. 10). Since CP02 corresponds to the determination condition, in addition to the combination of CP02 and CP03: (CP02, CP03), CP01 that is a further lower element (immediately below the element) of CP03 is extracted based on overlap information of the display element (FIG. 16) and a combination of CP01 and CP02: (CP01, CP02) is output (steps S317 to S319 of FIG. 10, and FIG. 15). Since the output of the element combinations based on overlap is finished for elements: CP02, CP04, CP05, CP06, CP07, CP08, and CP09 that are located immediately above CP03, thereafter, for the same elements: CP02, CP04, CP05, CP06, CP07, CP08, and CP09 that are located immediately above CP03, by taking elements in which it is determined by the overlap determination unit 202 that the elements overlap most closely (immediately above) as subjects, a combination of two elements that are determined by the combination extraction unit 302 to be close is output. For example, since CP02 and CP04 are determined by the combination selecting unit 20 to be close to each other, a combination of the elements (CP02, CP04) is output (FIG. 16).

The operations in steps S311 to S326 and the output of a combination of two elements that are determined by the combination extraction unit 302 to be close to each other are repeated until the inspection of all elements with overlapped elements is completed.

Next, a generation operation of color combination information will be described by taking the screen of FIG. 13 as an example. The combination classifying unit 30 receives element combination information (FIG. 16) that the combination extraction unit 302 outputs, then extracts color information from attribute information with respect to each combination of two elements in FIG. 16 to output color combination information, and creates a list of color combinations on the screen based on the color combination information as FIG. 17 (step S331 in FIG. 4).

Next, as one color combination that is not yet selected from the color combination list in FIG. 17, HSV=(0,0,100) (150, 1,88) is selected (steps S332 to S333 in FIG. 4). Thereafter, (CP01,CP03) (CP01,CP11) (CP03,CP05) (CP03,CP07) (CP03,CP09) (CP11,CP13) (CP11,CP15) (CP11,CP17) (CP11,CP19) (CP11,CP21) (CP11,CP23) are extracted as the element combinations in which color combination is (0,0, 100) (150,1,88), from combinations of two elements in FIG. 16, referring to FIG. 14 (step S334 in FIG. 4), then the numbers of the extracted element combinations are aggregated and the element combination number 11 is calculated (step S335 in FIG. 4). Further, the ratio of aggregated appearance number (11) of the color combination to combination total number (52) of two elements in FIG. 16 is calculated, and then appearance ratio (21.2%) of the color combination on the screen, that is in HSV=(0,0,100) (150,1,88) in FIG. 18, is output (S336 in FIG. 4).

The operation of steps S332 to S336 is repeated until the selection of all color combinations in the color combination list in FIG. 18 is completed.

Next, the operation of the inspection of color combination will be described by taking the screen in FIG. 13 as an example. The combination classifying unit 30 selects HSV= (105,80,100) (0,0,100) as the color combination that is not yet selected (steps S411 to S412 in FIG. 5), and compares color difference: 105 of the color combination with the held threshold value (for example, "color difference is assumed to be equal to or more than 170 and equal to or less than 190) (step S413 in FIG. 5). Since color difference 105 is within the range of the threshold value, saturation difference: 80 of the color combination is compared with the held threshold value (for example, "saturation difference is assumed to be less than 80") (step S416 in FIG. 5). Since saturation difference 80 exceeds the threshold value, the combination classifying unit 30 compares appearance ratio: 17.3% of color combination: HSV=(105,80,100) (0,0,100) with the held threshold value for determination for each color combination (for example, "appearance ratio is assumed to be equal to or less than 15%") (step S417 in FIG. 5). Since appearance ratio 17.3% exceeds the range of the threshold value, the combination classifying unit 30 outputs the determination result that the color combination is undesirable in terms of the saturation difference (step S418 in FIG. 5). Next, the combination classifying unit 30 compares brightness difference: 0 of the color combination with the held threshold value (for example, "brightness difference is assumed to be less than 80") (step S419 in FIG. 5). Since the brightness difference: 0 is within the range of the threshold value, the combination classifying unit 30 compares saturations: 80 and 0 of the color combination with the held threshold value (for example, "saturations of both colors are assumed to be equal to or less than 80") (step S422 in FIG. 5). Since saturations: 80 and 0 of both colors do not exceed the threshold value, the combination classifying unit 30 extracts and inspects following color combination: HSV=(150,1,88) (150,100,40) (steps S411 to S412 in FIG. 5).

Next, with respect to the extracted color combination: HSV=(150,1,88) (150,100,40), first, color difference: 0 of the color combination is compared with the held threshold value (for example, "color difference is assumed to be equal to or more than 170 and equal to or less than 190") (step S413 in FIG. 5). Since color difference 0 is within the range of the threshold value, subsequently, the combination classifying unit 30 compares saturation difference: 99 of the color combination with the held threshold value (for example, "saturation difference is assumed to be less than 80") (step S416 in FIG. 5). Since the saturation difference 99 exceeds the threshold value, the combination classifying unit 30 compares appearance ratio: 3.8% of the color combination: HSV=(150, 1,88) (150,100,40) with the held threshold value for determination for each color combination (for example, "appearance ratio is assumed to be equal to or less than 15%") (step S417 in FIG. 5). Since appearance ratio 3.8% is within the range of the threshold value, subsequently, the combination classifying unit 30 compares brightness difference: 48 of the color combination with the held threshold value (for example, "brightness difference is assumed to be less than 80") (S419 in FIG. 5). Since brightness difference: 48 is within the range of the threshold value, saturations: 1 and 100 of the color combination are compared with the held threshold value (for example, "saturations of both colors are assumed to be equal to or less than 80") (S422 in FIG. 5). Since saturations: 1 and 100 of both colors do not exceed the threshold value, the combination classifying unit 30 extracts and inspects the following color (steps S411 to S412 in FIG. 5).

Then, the combination classifying unit 30 repeats the operations from steps S411 to S425 until the inspection of all color combinations is completed.

The screen determination unit 40 receives the result of the inspection of color difference, saturation difference, brightness difference, and both brightness and saturation (FIG. 19), then aggregates the numbers of the element combinations having the color combinations that are determined to be undesirable in terms of the color difference, the saturation difference, and the brightness difference and in terms of both brightness and saturation to calculate "22" (steps S431 to S435 in FIG. 6), and then calculates the ratio to the total number (52) of the combination of two elements in FIG. 16 to output the appearance ratio: 42.3% of the undesirable color combination on a page (step S436 in FIG. 6). The appearance ratio: 42.3% is compared with the held threshold value for determination of the entirety of the screen (page) (for example, "the appearance ratio of the color combination having a problem is assumed to be less than 30% in the entire page") (step S437 in FIG. 6). Since the appearance ratio: 42.3% exceeds the threshold value, the screen determination unit 40 determines that the page has undesirable color combinations, and thus the screen determination unit 40 outputs the determination result (step S438 in FIG. 6).

Then, in a case where an information processing device includes the display unit 50 shown in the third embodiment, the display unit 50 receives an output from the screen determination unit 40, with respect to the color combination in which it is determined that color combination makes eyes easily tired, the followings are displayed: "the combination of background color HSV=(105,80,100) (0,0,100) 0,0,100) is the color combination which makes eyes easily tired in terms of the saturation difference" and "the current page, as the entirety of the page, has the color combinations which makes eyes easily tired."

As above, the description of embodiments of the present invention has been made referring to drawings, the embodiments are only examples of the present invention, and various configurations other than the above embodiments can be employed.

This application claims a priority based on Japanese patent application No. 2011-163564 filed on Jul. 26, 2011, and the entire disclosure is incorporated herein.

The invention claimed is:

1. A screen inspection device comprising:
a processor;
memory storing executable instructions that, when executed by the processor, causes the processor to perform the steps of:
creating a plurality of element combinations of which each is a combination of two display elements, based on screen data including a plurality of display elements, and selecting the element combinations in which a distance between the two display elements is equal to or less than a threshold value;
selecting, from among the selected element combinations, in which any one of color difference, saturation difference and brightness difference, and both brightness and saturation of the color combination of the two display elements exceed respective predetermined threshold values, and calculating an appearance ratio for each color combination, the appearance ratio being a ratio of the number of the element combinations belonging to one of the color combinations to a total number of the selected element combinations;
calculating the sum of the appearance ratios of the color combinations in which the appearance ratio exceeds a threshold value, and determining whether the calculated sum exceeds a threshold value;
changing color combination of the display elements constituting element combinations displayed on a display, in response to an input from a user;
displaying the screen data after the color combination is changed; and
updating the screen data in a storage unit in response to the changing of the color combination of the display elements constituting the displayed element combinations.

2. The screen inspection device according to claim 1, wherein the creating comprises creating all of the element combinations.

3. The screen inspection device according to claim 1, wherein the selecting, from among the selected element combinations, further comprises: among the two display elements which overlap with each other,
in a case where an entirety of an upper display element overlaps a part of a lower display element without contacting a side thereof, selecting the element combination configured of the two display elements,
in a case where the entirety of the upper display element overlaps a part of the lower display element with contacting the side thereof, and a part of the upper display element overlaps a part of the lower display element, selecting the element combination of a further lower display element of the lower display element and the upper display element, in addition to the element combination configured of the two display elements,
in a case where the upper display element overlaps an entirety of the lower display element with hiding the entirety of the lower display element, selecting the element combination of the further lower display element of the lower display element and the upper display element, and
performing a calculation process of the appearance ratio to the selected element combinations.

4. The screen inspection device according to claim 1, wherein the memory stores further executable instructions that, when executed by the processor, causes the processor to perform the steps of:
displaying, on the display, information for specifying the color combination for which the appearance ratio is calculated and the element combinations having the color combination.

5. A screen inspection method comprising:
causing a computer to create a plurality of element combinations of which each is a combination of two display elements, based on screen data including a plurality of display elements, and to select the element combinations in which a distance between the two display elements is equal to or less than a threshold value;
causing the computer to select the element combinations, in which any one of color difference, saturation difference and brightness difference, and both brightness and saturation of the color combination of the two display elements exceed respective predetermined threshold values, from the element combinations selected by the combination selecting unit, and to calculate an appearance ratio for each color combination, the appearance ratio being a ratio of the number of the element combinations belonging to one of the color combinations to a total number of the element combinations selected by the combination selecting unit;
causing the computer to calculate the sum of the appearance ratios of the color combinations in which the appearance ratio exceeds a threshold value, and to determine whether the calculated sum exceeds a threshold value;
causing the computer to change color combination of the display elements constituting element combinations displayed on a display, in response to an input from a user;
causing the computer to display the screen data after the color combination is changed; and
causing the computer to update the screen data in a storage unit in response to the changing of the color combination of the display elements constituting the displayed element combinations.

6. A non-transitory computer readable media recording a program that causes a computer to function as a screen inspection device, the program causing the computer to execute:
a function of creating a plurality of element combinations of which each is a combination of two display elements, based on screen data including a plurality of display elements, and selecting the element combinations in which a distance between the two display elements is equal to or less than a threshold value;
a function of selecting the element combinations, in which any one of color difference, saturation difference and brightness difference, and both brightness and saturation of the color combination of the two display elements exceed respective predetermined threshold values, from the element combinations selected by the function of selecting combinations, and calculating an appearance ratio for each color combination, the appearance ratio being a ratio of the number of the element combinations belonging to one of the color combinations to a total number of the element combinations selected by the function of selecting combinations;
a function of calculating the sum of the appearance ratios of the color combinations in which the appearance ratio exceeds a threshold value, and determining whether the calculated sum exceeds a threshold value;
a function of changing color combination of the display elements constituting element combinations displayed on a display, in response to an input from a user;

a function of displaying the screen data after the color combination is changed; and a function of updating the screen data in a storage unit in response to the changing of the color combination.

* * * * *

UNITED STATES PATENT AND TRADEMARK OFFICE
CERTIFICATE OF CORRECTION

PATENT NO. : 9,177,528 B2  
APPLICATION NO. : 14/234932  
DATED : November 3, 2015  
INVENTOR(S) : Yukiko Tanikawa Page 1 of 1

It is certified that error appears in the above-identified patent and that said Letters Patent is hereby corrected as shown below:

IN THE DRAWINGS

Drawing Sheet 6 of 19: Fig. 6: delete "(FIG. 3)" and insert --(FIG. 5)--

Signed and Sealed this
Twenty-second Day of March, 2016

Michelle K. Lee
*Director of the United States Patent and Trademark Office*